United States Patent [19]

Sato

[11] Patent Number: 4,915,888

[45] Date of Patent: Apr. 10, 1990

[54] METHOD OF MANUFACTURING A CONCRETE BLOCK HAVING DECORATIVE STONES EMBEDDED IN A SURFACE THEREOF

[75] Inventor: Toshiaki Sato, Yamanashi, Japan

[73] Assignee: Fuji Tokushu Concrete Industry Co., Ltd., Fujiyoshida, Japan

[21] Appl. No.: 210,036

[22] Filed: Jun. 22, 1988

[30] Foreign Application Priority Data

Oct. 19, 1987 [JP] Japan ................................ 62-263530
Jan. 14, 1988 [JP] Japan ................................ 63-6264

[51] Int. Cl.[4] .......................... B28B 1/16; B28B 1/28; B28B 3/00; B29C 39/12

[52] U.S. Cl. ...................................... 264/71; 264/233; 264/245; 264/256; 264/316; 264/333; 264/336; 264/DIG. 57

[58] Field of Search ............... 264/DIG. 31, DIG. 57, 264/256, 69, 71, 333, 336, 245, 233, 316

[56] References Cited

U.S. PATENT DOCUMENTS

| | | | |
|---|---|---|---|
| 536,993 | 4/1895 | Allen | 264/256 X |
| 1,162,172 | 11/1915 | Jones | 264/DIG. 57 X |
| 1,445,083 | 2/1923 | Jeppson et al. | 264/256 X |
| 1,646,667 | 10/1927 | Tobin | 264/256 X |
| 1,809,504 | 6/1931 | Carvel | 264/256 X |
| 1,856,906 | 5/1932 | Carvel | 264/256 |
| 3,097,080 | 7/1963 | Weir | 264/256 X |
| 3,227,785 | 1/1966 | Masreliez | 264/71 |
| 3,242,242 | 3/1966 | Bournique | 264/71 |
| 3,324,213 | 6/1967 | Anfinset | 264/71 |
| 3,378,617 | 4/1988 | Elmendorf | 264/256 X |
| 3,426,112 | 2/1969 | Taylor-Smith | 264/71 |
| 3,469,000 | 9/1969 | Smith | 264/256 X |
| 3,496,264 | 2/1970 | Grant | 264/256 X |
| 3,497,580 | 2/1970 | Taylor-Smith | 264/256 X |
| 4,085,176 | 4/1978 | Nakayama | 264/256 X |
| 4,146,599 | 3/1979 | Lanzetta | 264/256 X |
| 4,774,045 | 9/1988 | Kushida et al. | 264/256 |
| 4,784,821 | 11/1988 | Leopold | 264/256 X |

*Primary Examiner*—Jan H. Silbaugh
*Assistant Examiner*—Karen D. Kutach
*Attorney, Agent, or Firm*—Flynn, Thiel, Boutell & Tanis

[57] ABSTRACT

A method of making a concrete block having decorative stones embedded in a surface thereof includes the steps of placing on a face plate a layer of stones which includes a plurality of spaced decorative surface stones and includes filler stones substantially smaller than the surface stones and disposed in the spaces between the surface stones, applying a cement mortar on the surface stones and filler stones, introducing concrete into a separate mold, inverting the face plate and placing it on top of the concrete in the mold, consolidating the concrete and assembling the concrete and the sruface stones by applying pressure and vibration, removing the mold and the face plate, and curing the resulting block without the mold.

13 Claims, 3 Drawing Sheets

METHOD OF MANUFACTURING A CONCRETE BLOCK HAVING DECORATIVE STONES EMBEDDED IN A SURFACE THEREOF

BACKGROUND OF THE INVENTION

FIELD OF THE INVENTION

This invention relates to concrete products and a method of manufacturing same, and more particularly to a concrete block dressed with natural stones or rock (hereinafter called natural stone) finished so as to be exposed and a method of manufacturing same, and a concrete block having a surface divided into multiple portions and a method of manufacturing same.

DESCRIPTION OF THE RELATED ART

Heretofore, to produce a concrete block dressed with natural stones finished so as to expose the stones, there are several methods such as to bury natural stone or stones on a surface of the concrete before hardening the concrete by applying hardening retarder on a mold surface, or by fault separation to provide a laminated condition on the dressed surface after aging a compressed and vibrated concrete block which is manufactured by pouring concrete onto a dressing aggregate, such as natural stone.

Also, there were several other methods for this purpose, for example, to chip finish by means of a chipping tool, to chisel finish or to hammer finish a surface of the concrete block after hardening the concrete poured onto the dressing aggregate, such as natural stone to remove a part of the aggregate and the surface mortar.

Also, there is another method such as grinder finishing by which the concrete surface is ground by means of a grinder or whetstone.

Further, there is a sand blast finish by which a mortar portion on the surface and a portion of aggregate surface are shaved off by means of blasting steel or hard sand grains or there is a vacuum treating finish by which a surface mortar portion of the concrete body is removed by evacuating air to expose the aggregate surface.

However, in all of the above described methods, there are several drawbacks such as those described below:

In the washing-out method by means of said concrete hardening retarding agent, timely processing of washing out of the concrete component in response to the concrete hardening condition is essential but it is very critical matter to determine the proper timing, and it also has the drawback that the washed-out depth of the concrete is very shallow, on the order of 5 mm.

Also, it is difficult to cause the retarder to act equally on the entire surface of the concrete so as to make possible equal washing out of the concrete from the entire surface.

Also, in the wash-out method, the product cannot be finished beautifully because of the occurrence of the leaking out of bubbles when granite or lava is used as an aggregate.

Also, in the method in which natural stone is buried in the concrete before hardening, the stone can be easily separated after fixing of the stone.

In the finishing methods which were done by a took, such as a chipping finish or hammering finish, breakage such as edge chip-off occurs frequently, and furthermore, loosening of the aggregate may occur frequently.

Moreover, the finishing depth is shallow and the finishing operation consumes considerable time.

While the grinding method by means of a grinder or whetstone may provide flat finishing surface and very beautiful section of the aggregate may be obtained, it cannot provide the beauty of the natural shape of the aggregate.

By the mortar removing method by means of sandblast finishing or the evacuation method, substantial finishing depth cannot be obtained so that it is not suitable to expose a substantial portion of the aggregate.

Moreover, except for the wash-out method in which the mold removal is immediately carried out, the other methods described above have bad productivity because it is necessary to perform each operation after the mold removal which is done at least on the next day, or later, following the casting day of concrete of relatively large slump value.

Furthermore, there is a drawback that waste, such as rinsed water, washout dregs or grounds, chipped dregs 3 or shavings is produced.

Again, in all conventional methods, the useful aggregates for dressing are limited to the relatively small, definitely shaped ones, and aggregates having relatively larger size, smaller thickness or a group including different sized aggregates cannot be used and, even if conventional relatively small dressing aggregates are exposed on the surface, only a relatively small projection of the aggregate from the concrete surface can be realized.

Thus, in the methods heretofore proposed, there is no fully satisfactory method to provide surface exposed finishing of the dressing aggregates, and the productivity was low.

Also, because of poor adhesion between natural stone and the concrete, there is an essential defect that the natural stone is easily removed from the concrete when a relatively large size of the aggregate is used as a dressing.

Also, in the previous methods, the concrete surface inevitably appears in the points between aggregates thereby giving an artificial air or mood to the products.

Also, the design of the dressing of the conventional concrete block is limited because of the surface even though the natural stones are used.

The object of this invention is to provide concrete products, on the surface of which it is possible to perform expose-finishing of a natural stone having a round or flat shape or tiles, and to provide concrete products having colourful surface decoration.

SUMMARY OF THE INVENTION

Thus, as the results of concentrated effort of the inventor to obviate the drawbacks hereinbefore described and to provide novel concrete products dressable with almost all of the natural stones and having a colourful surface and a method of the manufacturing same, a first embodiment of the invention provides an excellent concrete product dressed with natural stones, obtained by the steps comprising, providing a surface portion of the concrete product, consolidating said surface portion with the concrete product body, pressing and vibrating said consolidated product, in which said surface portion is provided by juxtaposing surface dress aggregates in an arbitrary spacing on an upper surface of a bottom plate of a mold and filling fine grained aggregate in the spacing between said surface dressing aggregates and said upper surface.

Also, in the second embodiment of the invention, a concrete product having a surface dressed with aggregates is produced by carrying out steps comprising disposing on a point aggregate layer of fine grains, a dressing aggregate having larger size than that of said point aggregate of fine grain, pouring super-dry concrete having a slump value of 0–1 cm and consolidating the stratified layers of said concrete layer and said point aggregate layer. Thus, the point aggregate can be adhered to the concrete surface without entering or pressing out of the concrete portion to the point aggregate layer, and it is possible to produce a concrete product with large productivity and without pollution.

Also, in the third embodiment of the invention, a concrete product having two oppositely positioned surfaces both dressed with aggregate can be provided without any pollution by carrying out a manufacturing process comprised of, disposing surface aggregates on a point aggregate layer having a much smaller size than said surface dress aggregate, pouring superdry concrete having a slump value of 0–1 cm on said surface dressing aggregates so as to provide a spacing on the upper end of a mold, disposing surface dress aggregates on said concrete layer, providing point aggregate layer on said surface aggregates and pressing the assembled concrete product.

Also, in the fourth embodiment of the invention, the bottom plate of the mold is subdivided into multiple portion by means of preliminarily arranged partitions. The surface dressing aggregates are disposed side-by-side, with spacing therebetween, on said subdivided bottom plate surface. The spaces between said dress aggregates are then filled with point aggregate. Alternatively, these latter two steps may be carried out inversely, such as, providing the point aggregate layer at first onto said surface and then disposing surface dress aggregates on said layer. After pouring concrete on the aggregates, pressure and vibrating motion are applied to the assembly to consolidate same. By these processes, concrete products dressed with natural stones having colourful surface can be obtained. Thus, the object of the invention is achieved.

Figure 1:
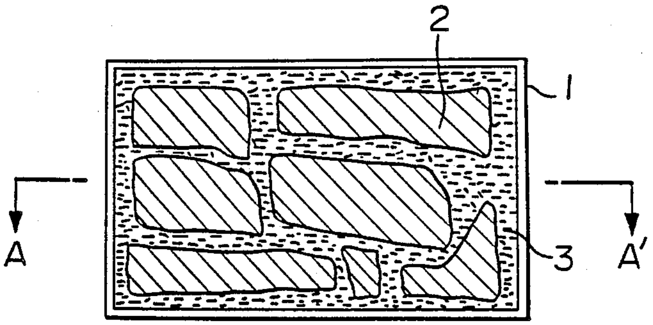
FIG. 1 is a plan view of the bottom plate on which point aggregate and surface dressing aggregates are disposed according to the first embodiment of the invention.
Figure 2:
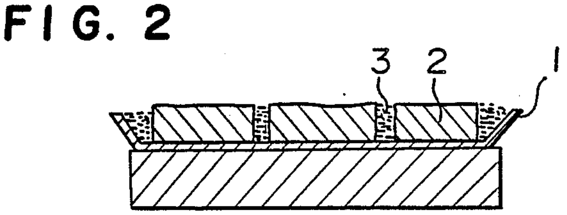
FIG. 2 is a cross-sectional view taken along the A—A′ in FIG. 1 after filling the mold with mortar.

1: bottom plate
2: surface dressed aggregates
3: point aggregate
4, 5: side wall of the mould
6: concrete
7: pressing plate
8: vibrating machine
9: sponge
10: mortar
11: adhesive tape

DESCRIPTION OF THE PREFERRED EMBODIMENTS

Following is the description of one embodiment of the invention based upon the drawing, but it will be understood that the invention is not limited by this description.

FIG. 1 shows a method adapted to manufacture a surface dressed concrete block in which a thin, flat-shaped surface dressing aggregate is used. At first, to provide the surface portion of the concrete block, surface dress aggregates 2 are disposed on the bottom plate 1 with an arbitrary spacing, then, point aggregate of fine grain 3 is filled in the spaces between the surface dressing aggregates and the bottom plate.

In this case, the kind of the aggregate used for the surface dressing of the concrete product in accordance with the invention is not specifically limited, and natural stone, for example, andesite, marble, granite, processed into thin, flat product or tile, ceramics, plastics and bricks, or round or spherical shaped stone, lava, or small sized natural stone may be used.

For the point aggregate 3, sand, mud chips of ore or the like, or slug or synthetic resin may be used. These materials may have grain sizes smaller than that of the surface dressing aggregate, and a highly colorful point aggregate may be selected to harmonize with the dressing aggregate. For example, for the dressing aggregate of andesite, small chips of andesite, or, for granite, small chips of granite may be used as the point aggregate. In some cases, entirely different color combinations between the dressing aggregate and point aggregate may be adopted. Further, in the case where the product is scheduled to be used to construct a concrete-block, the combination of the colours of the dressing aggregates and the point aggregate may be selected appropriately under the consideration of place and object of the construction.

Projection of the dressing aggregates from the concrete surface of the finished product may be adjusted by adjusting the quantity of the point aggregate used.

The quantity of the point aggregate depends to its material. It is generally preferable that the thickness thereof may be selected to be $\frac{2}{3}$ of that of the dressing aggregate.

Also, it is preferable that 4.0–6.0% of water may be added to the point aggregate before it is supplied to the bottom plate.

The purpose of the water is to prevent slip-off of the point aggregate from the bottom plate by the centrifugal force which is generated by the inverting motion of the bottom plate when the bottom plate is used with an inverting type concrete block forming machine described later, when the point aggregate is in a too dry condition.

If the water quantity is less than 4%, the effect is too small, and if it exceed 6%, difficulty of the cohesion with a mortar described later may arise.

Also, it may be useful to apply water-soluble binder material in place of or with the water.

In this case, for the water-soluble binder material, paste which is available in the market may be successfully used after dissolving same with water.

Also, it is possible to apply preliminarily water-soluble binder material on the surface of the bottom plate or to cover with an adhesive tape the surface of the bottom plate.

When the water-soluble binder material is to be applied on the surface of the bottom plate, it is preferable to apply water-soluble binder material on a paper, synthetic resin such as cellophane, plastics, or cloth which is covering the surface of the bottom plate.

Also, when using adhesive tape, the surface of the bottom is covered with a paper gum-tape the adhesive surface of which being adhered to the upper surface of the bottom plate surface.

Then, natural stone, tiles or the like are mounted in any arbitrary spacing on them, and further, point aggregate is applied to the spaces between the bottom plate and the dressing aggregates.

By using gum-tape or the like, dressing aggregates of a shape which includes not only flat shapes but also rounded or spherical shaped ones can be utilized and even when an invertible concrete forming machine is used, there is not risk of displacement of the dressing aggregate caused by the centrifugal force acting during the inversion of the bottom plate for placement on a concrete body or by the vibration caused by the vibrator.

These gum-tapes or the like may be torn off after the setting of the concrete product on place after the aging thereof to prevent contamination of the dressed surface before setting.

Also, it is possible to prevent displacement of the dressing aggregate caused by the vibration or the like, by covering the bottom plate with elastic material, such as sponge 9 or rubber plate, or with cloth before covering the bottom plate with the gum-tape or the like.

Figure 3:
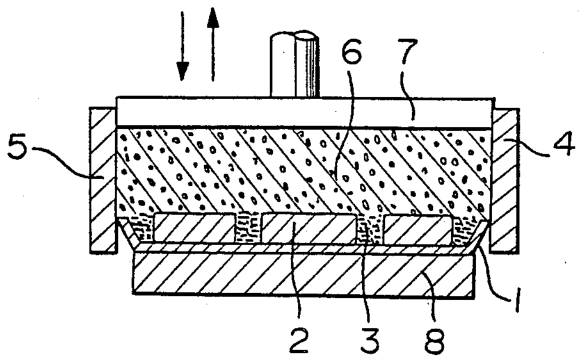
FIG. 3 is a cross-sectional view showing the mold mounted on a vibrating machine after mounting a side wall of the mold and a pressing plate.
Figure 5:
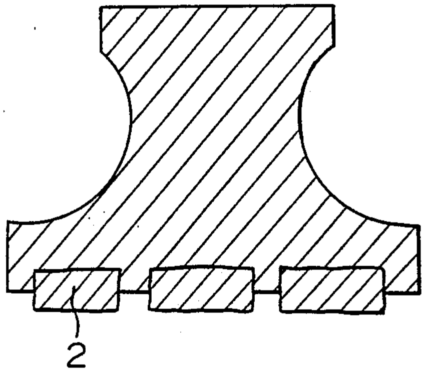
FIG. 5 is a cross-sectional view of the concrete block in accordance with the invention after removal of the mold.

Subsequently, concrete is poured as shown in FIG. 3. Then the stratified structure is consolidated by pressing 7 and vibrating through pressing plate with vibrator 8. Then the concrete product such as shown in FIG. 5 is provided after demoulding and aging.

Figure 4:
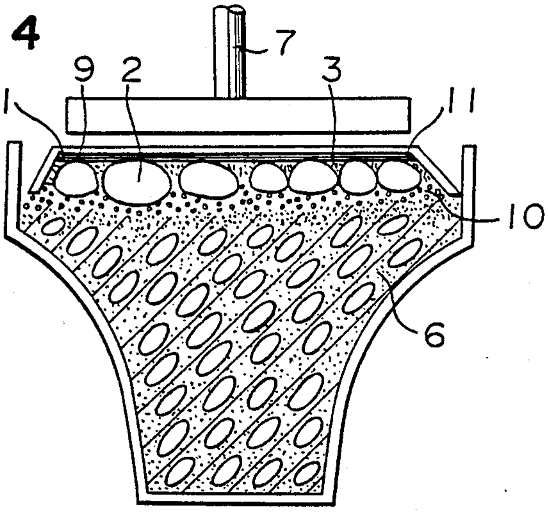
FIG. 4 is a cross-sectional view of the mold on the inverted type concrete block forming machine after pressing and vibration are applied.

Also, forming may be achieved by pressing the bottom plate in the 180 degree inverted condition onto concrete which has been introduced into the mould of the concrete forming machine as shown in FIG. 4.

In this case, it is preferable to apply mortar, paste, soft concrete or the like on the dressing aggregate 2 and point aggregate 3 for the binder to the concrete and to prevent displacement of the dressing aggregate and point aggregate caused by the centrifugal force induced at the inversion.

Also, it is preferable to provide 1–10% of water in the mortar for the binding purpose.

Also, water-soluble binder material may be added in place of or with the water.

In this case, for the water-soluble binder material, a mortar binding force reinforcing agent may be used to improve miscibility, bindability, waterproofness or the like.

For the mortar binding force reinforcing agent, high molecular emulsion, acrylic, ethylene/vinyl acetate, synthetic rubber or the like may be used.

Also, the assembled bottom plate as described above may be supplied to the inverting type concrete block forming machine and is integrated with the concrete in the mould of the machine to form concrete block dressed with natural stones.

Figure 6:
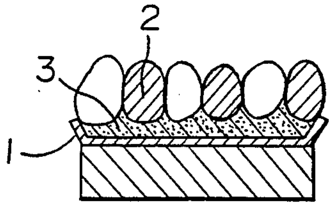
FIGS. 6 and 7 show another embodiment in which point aggregate layer is formed before disposing dress aggregates.

FIG. 6 shows a forming method using surface dress aggregates 2 of rounded or spherical shape, and in this case, at first, the bottom plate 1 is covered with point aggregate 3, then the aggregate 2 for surface dressing is mounted on the point aggregate 3 by burying the latter into the former. After the concrete is added on the aggregate layers, it is preferable to consolidate the stratified assembly by applying pressure through the pressing plate 7 and vibration by the vibrator 8.

Although the concrete which is used to form these concrete products is not specifically limited, it is preferable to use super-dry concrete, the degree of which being such that in the tightening period, water (including cement) may be exuded but not to flow out, the slump value of which being about 0–1 cm.

For the consolidation of the concrete, it is preferable to apply pressure while applying vibration.

In this case, the pressing through the pressing plate 7 is continued until the condition is obtained that the surface dressing aggregates 2 do not move when the vibration is applied.

Then, by applying vibration from the lower portion while applying pressure through pressing plate 7, the point aggregate 3 is compressed, and when the point aggregate is lowered to one-half the height of the surface dressing aggregate, vibration is stopped and the product is removed from the mold and aged.

The direction of the pressure or the vibration may be selected to be vertical or horizontal or combination thereof in accordance with the object of the concrete product.

Further, in the case where a concrete having a slump value of more than 5 cm. is used, it is preferable to apply vibration locally or by means of bar type vibrator or the like.

Figure 7:
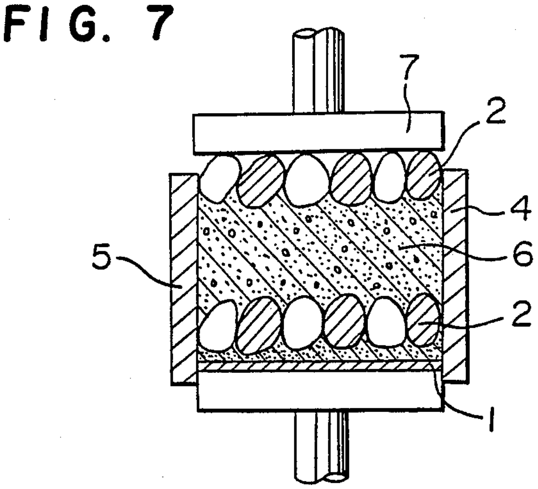

Also, the surface dressing aggregate 2 may be disposed not only on the lower surface of the concrete body but also on the upper portion of the mold as shown in FIG. 7. In this case, after the disposition of the dressing aggregate 2 on the concrete body, point aggregate 3 is applied to the spacing between dressing aggregates 2 and then pressure and vibration is applied to produce a concrete product having opposite surfaces, both of which being able to have surface dressing aggregates.

After aging is finished, except for the point aggregate of fine grain 3 which are adhered to the concrete, the remaining aggregates of fine grain are removed from the concrete when the mold is removed naturally. The removal of the point aggregate 3 is carried out by directing air or water against the surface of the concrete product. Thus, the concrete product in accordance with the invention is provided.

For this purpose, conventionally, surface finishing, such as grinding or shaving are performed, but, according to the invention, a very fine finished product is provided by directing the air or water gently, so that there is no dust pollution which inevitably occured in the conventional method.

Further, a colourful concrete product can be manufactured by dividing the bottom plate with a partition and applying identical or different kinds of surface dressing aggregates 2 and fine grained point aggregate 3 to each divided portion.

Figure 8:
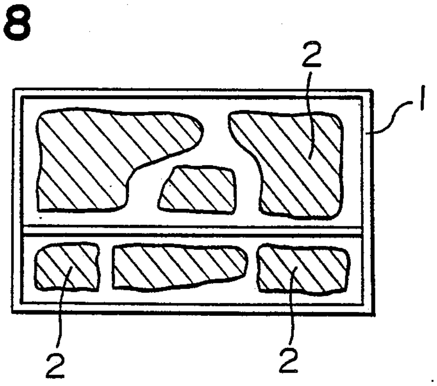
FIG. 8 and FIG. 9 are plane views of the bottom plate in which the bottom plate is subdivided into a plurality of portions. In the drawing, the numerals refer to following elements.
Figure 9:
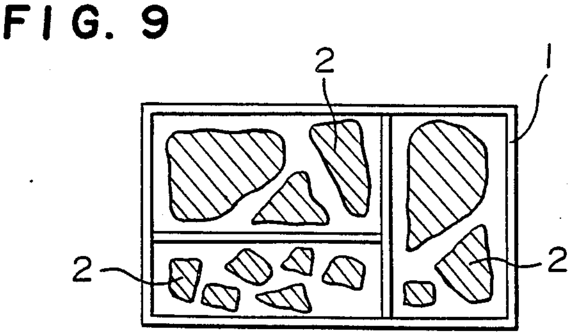

In this case, in accordance with surface design, the number of divisions may be selected in any number, such as two or three as shown in FIG. 8 or in FIG. 9.

Also, the partition may be made by means of steel pipe or by means of a bottom plate with partition(s).

By providing partition(s), it is possible to provide multipurpose colourful concrete products by arranging, for example, in the two portion arrangement, large sized dressing aggregates in the upper portion and relatively small sized dressing aggregates in the lower portion, or, by arranging different dressing aggregate in each portion, or by applying different coloured fine grained point aggregate.

Also, as a result of providing masonry of various combinations by employing these colourful surfaced concrete products as masonry blocks, it is possible to realise block structure with personality and having various designs.

In accordance with the invention, it is possible to provide concrete products having colourful surfaces, because it is possible to provide concrete products having exposed-finished surface dressing with large or small sized natural stone(s) of planar or spherical shape.

In accordance with the invention, it is possible to project the aggregates having a size of from larger ones to smaller ones or combinations thereof in a manner to perfectly display the beauty of the natural stone on the concrete block.

Also, it is possible to employ not only flat or planar dressing aggregate, but also round or spherical aggregates by means of gum-tape or the like or elastic material such as sponge, and there is no risk of displacement of the dressing aggregate by the centrifugal force caused by the inversion or by the vibration by means of a vibrator, when the product is processed on the invertible concrete forming machine.

Also this process results in good operation efficiency and enables division of operation, and it is possible to prevent contamination of the dressed surface during masonry operation.

Also, because there is no exposure of the naked concrete surface on the point portion because of the adhesion of the fine grained point aggregate of the natural stone on the concrete surface, it is possible to manufacture products of natural feeling.

Heretofore, to construct some objects with natural stones, natural stones have been assembled by a mason without any treatment, but, in accordance with the invention, it is possible to employ and assemble concrete blocks having their surfaces dressed with natural stone(s), thus enabling an increase of the operational efficiency and reduction of a considerable amount of labor.

Also, it is possible to fabricate a concrete block structure having a design not found heretofore by employing colourful concrete blocks and, also, it is possible to construct a structure of superior appearance as a whole, by combining it with various kinds of construction.

Because large sized natural stones are not used, as is the case where masonry is made with natural stone, small sized ones are employable as a dressing aggregate and also chips or the like, which seemed heretofore to be scraps, can be used as a fine grained point aggregate, so that effective utilization of the natural resources can be achieved. There is no need to employ a cast-in system and masonry blocks can be used. Moreover, because it is possible to provide a mass-production process, the manufacturing cost becomes much cheaper than conventional method, and also high labor efficiency may be obtained.

Also, because various kinds of natural stone(s) can be used for the surface dressing, and various kinds of designs may be applied on the surface by their combination, it is possible to derive beautiful character to reproduce excellently a natural mass-feeling and individuality when employing it to the preparation of housing site, stone wall, or landscape gardening. Also, it is possible to contribute to the protection of environment by harmonizing with natural environment when it is employed in the civil engineering work, such as bank-retaining, riverbed, or entrance and/or exit of tunnel in the national park or other park.

Further, there is no pollution from the generation of dust particles which heretofore possibly occurred.

Hereinbelow, this invention will be further illustrated with examples.

EXAMPLE 1

Andesite plates 2 having a width of 50–300 mm and a thickness of 40 mm are disposed on the bottom plate 1 with spacing therebetween, as aggregates for dressing. Then granite chips 3 are filled in the spaces between the dressing aggregates to a height substantially equal to that of the dressing aggregates, as shown in FIG. 1.

Then, the mold is assembled by combining the bottom plate 1 with side walls 4 and 5 as shown in FIG. 3.

Then, super-dry concrete 6 having 0 slump value and coloured with black pigment (iron oxide series; added quality: 5 weight % of cement quantity) and having composition of; W/c=41%, S/a=54%, W=115 kg/m3, C=280 kg/m3, S=113 kg/m3, G=963 kg/m3, LUBURIS (trade name) mixing agent CX=0.56% is introduced into the mold from above through a belt conveyer.

Then, consolidation is carried out by pressing from above through pressing plate 7 and simultaneous vibration from below by vibrator 8. After than, side walls 4, 5 are removed.

The demoulded block is transferred with the bottom plate 1 to the aging room and aged until the next day.

When the bottom plate 1 is removed after the aging, unnecessary fine grained point aggregates are automatically removed and a concrete block having aggregates of andesite on the surface thereof is provided.

EXAMPLE 2

A concrete block is provided made by substantially the same process as that of the Example 1 with the exception that the bottom plate is divided by the ratio of 2:1 into upper and lower portions. In the upper portion, relatively large granite for dressing aggregate is disposed and blue pigmented sand is used as fine grained point aggregate, and in the lower portion, relatively small andesite is disposed as a dressing aggregate and chipped powder of andesite is used as fine grained point aggregate.

When the bottom plate is removed the next day, a concrete block the surface of which is divided into two portions and having colourful surface is obtained.

What is claimed is:

1. A method of manufacturing a concrete block having decorative surface stones embedded in a surface thereof; comprising the steps of: placing on a face plate a layer of filler stones, inserting decorative surface stone partially into said layer of filler stones, said surface stones being spaced from each other and having sizes substantially larger than the sizes of said filler stones, applying a layer of a cement mortar over said surface stones and said filler stones, introducing concrete having a slump value of substantially 0 cm into a separate mold, inverting said face plate having said stones and mortar thereof and placing same on the top of said concrete in said mold, applying pressure and vibration to said concrete and stones to consolidate said concrete and to assemble said concrete and said surface stones, removing said mold and said face plate from said assembled concrete and surface stones after said step of applying pressure and vibration, and thereafter curing the resulting concrete block having said decorative surface stones embedded in a surface thereof without said mold.

2. A method of manufacturing a concrete block having decorative surface stones embedded in a surface thereof, comprising the steps of: placing decorative surface stones with spaces therebetween on a face plate, filling said spaces between said surface stones with filler stones of a size substantially smaller than said surface stones, applying a layer of a cement mortar over said surface stones and said filler stones, introducing concrete having a slump value of substantially 0 cm into a separate mold, inverting said face plate having said stones and mortar thereon and placing same on the top of said concrete in said mold, applying pressure and vibration to said concrete and stones to consolidate said concrete and to assemble said concrete and said surface stones, removing said mold and said face plate from said assembled concrete and surface stones after said step of applying pressure and vibration, and thereafter curing the resulting concrete block having said decorative surface stones embedded in a surface thereof without said mold.

3. A method of claim 2, including before said step of placing said surface stones on said face plate the step of dividing said face plate into a plurality of portions by providing partition members thereon, and wherein said step of placing said surface stones on said face plate is carried out by placing a respective different kind of said surface stone on each said portion of said face plate.

4. A method of claim 2, including prior to said step of filling said spaces between said surface stones the step of preparing a mixture which includes said filler stones and includes 4% to 6% water, said step of filling said spaces being carried out by introducing said mixture into said spaces.

5. A method of claim 2, including prior to said step of filling said spaces between said surface stones the step of preparing a mixture which includes said filler stones and a water soluble binder, said step of filling said spaces being carried out by introducing said mixture into said spaces between said surface stones.

6. A method of claim 2, including prior to said step of placing said surface stones on said face plate the step of applying to said face plate a water soluble binder.

7. A method of claim 6, including prior to said step of applying said water soluble binder to said face plate the step of covering said face plate with a sheet material, said step of applying said water soluble binder being carried out by applying said water soluble binder to said sheet material on said face plate.

8. A method of claim 2, including prior to said step of placing said surface stones on said face plate the step of placing on said face plate a layer of gum tape.

9. A method of claim 8, including prior to said step of placing said layer of gum tape on said face plate the step of covering said face plate with a sheet material, said gum tape being placed on said sheet material on said face plate.

10. A method of claim 2, wherein said cement mortar includes one percent to ten percent water.

11. A method of claim 2, wherein said cement mortar includes a mortar binding force reinforcing agent.

12. A method of claim 2, including after said step of removing said mold the step of removing said filler stones from said resulting concrete block by directing a stream of pressurized fluid onto said resulting concrete block.

13. A method of claim 2, wherein said step of applying pressure and vibration includes the steps of first applying pressure and thereafter initiating said applying of vibration while continuing said applying of said pressure.

* * * * *

UNITED STATES PATENT AND TRADEMARK OFFICE

CERTIFICATE OF CORRECTION

PATENT NO. : 4 915 888

DATED : April 10, 1990

INVENTOR(S) : Toshiaki SATO

It is certified that error appears in the above-identified patent and that said Letters Patent is hereby corrected as shown below:

Column 8, line 65; after "thereof" change the semi-colon (;) to a comma (,).

Column 9, line 6; change "thereof" to ---thereon---.

Signed and Sealed this

Third Day of September, 1991

*Attest:*

HARRY F. MANBECK, JR.

*Attesting Officer*

*Commissioner of Patents and Trademarks*